Nov. 27, 1951 C. G. PADEN 2,576,236

METHOD FOR CLEANSING EGGS IN BULK

Original Filed Oct. 3, 1949

Inventor
Charles G. Paden.
By Chas W Hull
Attorney

Patented Nov. 27, 1951

2,576,236

UNITED STATES PATENT OFFICE 2,576,236

METHOD FOR CLEANSING EGGS IN BULK

Charles G. Paden, Millerstown, Pa., assignor to Whirlaway Egg Washer Company, Harrisburg, Pa., a partnership Original application October 3, 1949, Serial No. 119,334. Divided and this application August 21, 1950, Serial No. 180,524

22 Claims. (Cl. 99—113)

The present invention relates to egg processing and more particularly to novel methods as well as novel means for cleansing eggs. This is accomplished by reducing the handling of the eggs to a very minimum, while at the same time taking advantage of characteristics of the eggs and their qualities to enhance and accelerate the cleaning operation.

Prior to one or two years ago, the uniform practice of cleaning freshly laid eggs was to clean them one by one, that is, individually by manually applying a dry brush with an abrasive covering. In other words, eggs were customarily cleaned without liquid, that is "dry cleaned," and the trade, in general, not only frowned upon the use or application of any liquid, but actually preached against it. It was generally accepted that the use of water or other liquid would impair the quality of the eggs, under methods then known and practiced.

However, within the past year or two, the application of some limited amount of liquid with a brush applicator has seen some acceptance. Prior to the present invention, therefore, the generous use of a liquid, either in a shower onto the eggs or by immersing the eggs in a bath for a brief period, has been downright "heresy" in the trade. Moreover, the cleaning of eggs in a group or in bulk, rather than one by one, had been unheard of. Accordingly, with the present improvements, the task of cleaning, in this industry has been lightened but, before the acceptance of these improvements, it required painstaking education to overcome deep-rooted theories of "dry cleaning" only. Now, the immersion method and the method of applicant's invention, are accepted as actually improving the quality of the eggs, as set forth hereinafter.

It is a primary object of the improvements to provide a novel method of cleaning eggs in bulk, attended by a minimum of handling and a maximum output.

A further object is to provide novel, inexpensive and simple methods for cleansing eggs, which may be practiced without extensive experience and which employs immersion, and/or a whirling or circumferential current of liquid.

In achieving these objects, applicant employs methods wherein the eggs are constantly maintained in bulk in a cluster or pile in inter-engaging relationship. In other words, the surfaces of the eggs are mutually engaged in "shell to shell" relation while the method is being practiced.

A further object is to provide a novel cleansing process whereby the freshness of the eggs is unimpaired, and the temperature of the eggs is partially employed to achieve an improved result. A further object is to provide improved methods of washings eggs, wherein the movement of the eggs in bulks is reduced to a minimum, so as to minimize movement of the contents of the egg within the shell.

This application is a division of my application, Serial No. 119,334, filed October 3, 1949, for Improvements in Apparatus for Cleansing Eggs in Bulk, now matured into Patent No. 2,520,889 of August 29, 1950.

These and other objects will be apparent, upon reference to the accompanying specifications and drawings, in which.

Figure 4:
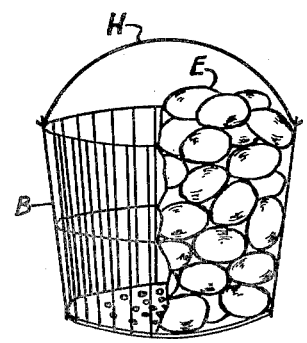
Fig. 4 is a perspective of a conventional egg basket, employed in practicing the methods.

In Fig. 4, applicant has illustrated a conventional basket B for gathering eggs E. These baskets are commonly used in the trade, i. e., on large poultry farms for harvesting eggs from the nests. They conveniently hold a gross of eggs and it is customary to gather the eggs in such a basket until it is full and then use another basket for gathering more of the eggs, and so on.

The eggs in such baskets are obviously very dirty, due to manure as well as to dirt or dust from the nests. Moreover, the eggs are not only warm but the texture of the shells as well as the quality and duration of freshness are dependent on prompt and immediate treatment and attention. Furthermore, egg yolk from an egg broken by the hen in the nest seems to have special adhesive qualities, and resists removal from adjacent eggs. Applicant's methods are designed and adapted to successfully remove this and any foreign matter on the shell.

Numerous devices in the art have failed to achieve commercial success due, it is believed, to the fact that there is too much time lag between the harvested eggs and the cleansing operation. Furthermore, additional handling of individual eggs, to prepare them for feeding to an egg washer, has been detrimental in numerous ways.

A basket of warm, newly gathered eggs cannot profitably be left standing to await transportation or feeding to a cumbersome egg washing machine. But past practice has required such waits. In devices of the prior art, the eggs have been customarily delivered to the feed conveyor, initially in wire baskets such as B in Fig. 4, whereupon they must be manually removed in groups of three or four per hand to the belt conveyor. It is obvious that the capacity and speed of such conveyor is limited by the fragile nature of the egg and for that reason, baskets of eggs stand in line, waiting to be "fed" to the washer.

The detrimental effect of this manifold. As a primary fault, this unavoidable pause permits the eggs to cool. The manure and dirt become more fixed to the shell. The texture of the shell becomes fixed, so that bacteria can more readily penetrate. As explained later herein, the temperature of the egg should not be changed more than once, from nest temperature to atmospheric temperature. This means that the cooling from nest temperature should occur but once so as to preserve the freshness of the egg. However, with large poultry farms, where thousands of eggs are gathered at one time, it is apparent that the eggs which are last fed to the washing machine have already become cooled, and consequently are heated in the cleansing process, to the impairment of the freshness of the product.

Under other circumstances, where egg washing machines are not available, the cleansing is done by hand, necessitating grasping each egg individually. This practice is not only slow and tedious, but is unpleasant and taxing for the hands of the operator, due to the necessity for retaining the hands in the egg bath. A further method recently employed by poultrymen, with limited success, is the use of a garden hose. It is not uncommon for the poultryman to turn a stream of water from a hose, onto a basket of eggs, such as shown in Fig. 4. However, the eggs in the interior seldom if ever are fully cleaned by this method, with the result that they must be washed again, after the basket is emptied.

Having observed these and numerous other short-comings in the field, applicant has devised methods to facilitate and accelerate the cleansing of eggs and at the same time preserve their superior quality.

Figure 1:
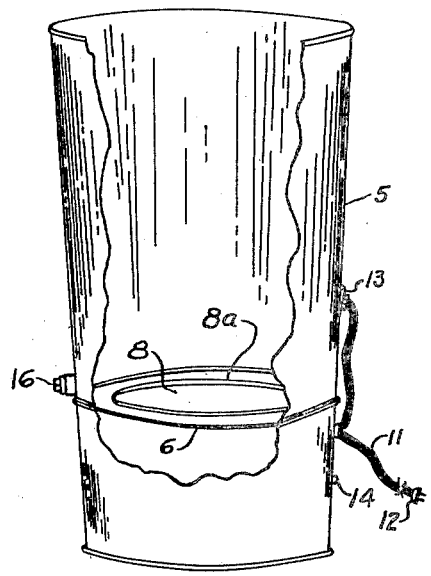
Fig. 1 is a perspective view, with parts broken away of one form of apparatus for use in practicing the method.
Figure 2:
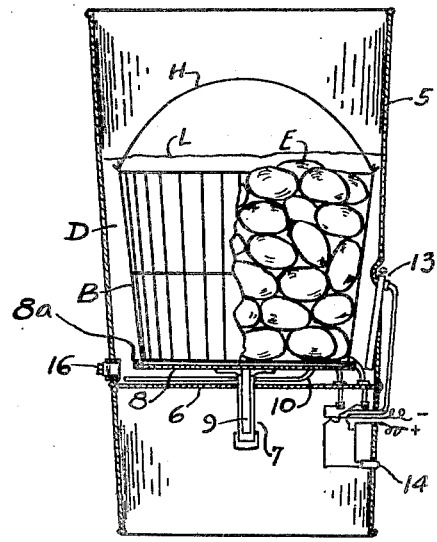
Fig. 2 is a section of the device in Fig. 1, illustrating the complete apparatus for practicing the method.

By way of illustration, reference is made to Fig. 2, for one form of apparatus for practicing the method, wherein 5 is a tapered container or tank or sleeve, having a partition or floor 6, in which a bearing 7 is axially provided. A platform, disc or turntable 8 is provided with an axially depending stud 9, which is removably disposed in bearing 7, in such a manner as to support the platform or turn-table in spaced relation above the floor 6. The relation of parts just described is to provide a swiveled platform or turn-table 8 immediately above the floor 6. An annular or peripheral flange 8a is provided on said turn-table 8, to prevent undue lateral movement of a basket B, adapted to be supported thereon. While this flange is the simplest expedient for orienting the basket B on the turntable, other means may be provided for preventing the basket from slipping off the turntable, during the revolution of basket and turntable, as hereinafter described.

An electrical heating coil 10 is provided along the inside periphery of the floor 6 and slightly above it. This coil has the usual cord 11 and plug 12 for attachment to a source of electrical energy, not shown. A thermostat 13 is connected in the line, with a red signal light 14, adapted to maintain the solution, hereinafter referred to, at any temperature for which the thermostat is set.

A liquid detergent D is placed in the container 5, to any desired level L, preferably to a level to cover the eggs E. To take a typical example, the electrical plug 12 is plugged in and the thermostat is set for 120° Fahrenheit. This temperature is preferably maintained throughout. A drain or clean out plug 16 is provided at the bottom of container 5.

Such containers 5, charged with a liquid detergent in the manner just described, are placed at intervals in the barn or other building where the hens' nests are located. A basket B of harvested eggs, as soon as it has been filled to capacity, may be carried by handle H to the container 5. The operator lowers the wire basket B of eggs, about twelve dozen in number, into the detergent D in container 5, until the basket is immersed and rests on platform or turntable 8, at which time the liquid detergent rises to a level L, slightly above the level of the eggs in bulk in the basket, but below the protruding handle H of the basket.

In this condition, as partially illustrated in Fig. 2, the eggs in the basket are in a cluster, i. e., they are mutually supporting each other in shell to shell relationship. The arched surfaces of the eggs are contacting one another on all sides of all the eggs, causing an "arching" or "bridging," whereby the eggs are held immovable, and this mutual support against relative movement reduces breakage or cracking to a very minimum. Moreover, movement of the eggs relative to each other while movement of the basket transpires, unfavorably prolongs the cleansing operation.

The next step in the method of cleansing comprises the movement of the clustered eggs in bulk as a unit and the movement of the liquid detergent, relative to one another. In the apparatus depicted in Fig. 2, the cluster of eggs is reciprocated as a unit, relative to the liquid. In the embodiment shown in Fig. 3, the cluster of eggs is permitted to rest, while the liquid is set in motion. As an incident to this practice of the method by the apparatus in Fig. 3, the use of the liquid in the manner hereinafter described, causes slow revolving or rotation of the basket containing the eggs, about a vertical axis.

Referring to the method practicel by the embodiment of Fig. 2, the operator grasps the handle H of basket B by hand. He thereupon twists the basket of eggs back and forth in a reciprocating rotary motion. This causes the cluster of eggs in bulk to move as a unit through the liquid. Both the basket B and platform or turn-table 8, on which it rests, are reciprocated. It will be seen that, as the eggs are moved in a clockwise direction, during the initial rotation, it tends to urge the liquid in a like direction. However, thereafter, with each reverse rotary movement of the eggs, the current and direction of the liquid lags behind so that the eggs and liquid are constantly moving in opposite directions over one another. As a result, minute eddies are set up in the interstices between the eggs, which serve, not only to accelerate the removal of ordinary dirt, but also to "eat" at the congealed or encrusted manure or egg yolk, much in the manner by which a brook or river eats away its banks. This step in the cleansing method is of paramount importance because of the speed with which the manure is removed and for the additional reason that the eggs are thoroughly cleansed without the physical application of a brush or the hands. In existing practice, the necessity, at times, of scrubbing the eggs with the bare hands or with brushes, causes an increase in the breakage and also tends to drive bacteria through the pores of the egg shell into the interior of the egg.

The step above described may be practiced by reciprocating the eggs for several minutes. The buoyancy of the liquid on the basket of eggs tends to reduce the weight somewhat, so that the energy of the operator is conserved. Thereafter, the entire basket B is removed by handle H, and set aside to dry in the basket.

The step of drying is accelerated because of the heat of the detergent, the warmth of the eggs and the access of air to the interstices between the eggs.

The prompt use of this step in the method greatly enhances the quality and saleability of the eggs. Realizing that a warm liquid at about 120° Fahrenheit is preferable in the cleansing process, applicant has found that it is detrimental to the eggs, if they are allowed to cool below nest temperature before being cleaned. This is due to the fact that applying the cleaning process after the eggs have been allowed to cool causes their temperature to be raised again due to the heat of the liquid. When the eggs cool a second time in the drying process, they do not have the same quality or freshness. It is apparent, therefore, by practicing applicant's method, that the eggs are cleansed while warm from the nests and, therefore, cooling of the eggs occurs only once. In this state, the eggs are found to be of the best quality.

As stated heretofore, the temperature of the detergent is preferably maintained at a temperature of 120° Fahrenheit. It is commonly known that the temperature of the freshly laid egg is about 105° Fahrenheit and this level declines to somewhat between 90 and 100 degrees Fahrenheit, depending on how long they lay around before being cleansed. With these facts in mind, it is noteworthy that, in practicing applicant's methods, it is always preferable to have the temperature of the detergent equal to, or greater than the temperature of the eggs to be washed.

In actual practice, the container or sleeve 5 may be used to cleanse about fifteen to twenty-five baskets of eggs, with one charge of liquid, before being drained, flushed out, and recharged.

It is significant that, in applicant's method, the dirt or manure are removed more readily due to the assistance given by the warmth of the egg shells.

Some additional advantages of applicant's method over prior art methods include the facility with which a broken egg is disposed of. Applicant is informed that, in existing machines, a broken egg may require complete stoppage for cleaning out the broken egg from the parts, before further cleansing of the remainder can be resumed. In the present invention, a broken egg is washed out of the basket B during the practice of the cleansing method and without arresting or interrupting it. The current and counter-current or agitation hereinbefore described drives the contents of the broken egg from the cluster.

In the trade, it is common for hens to produce thick shelled eggs of uniform texture under certain conditions, while, under other conditions, they may produce thin shelled eggs of non-uniform texture. Eggs of the latter type crack very easily, and the loss in breakage is frequently substantial during the cleansing operations heretofore employed. To avoid this, poultrymen have resorted to changing the diet of the hens to include more calcium and thereby strengthen the shells to reduce cracking and breakage.

In apparatus and methods heretofore employed, the use of brushes or other expedients requiring the application of pressure to remove the dirt from the shell has caused a high breakage rate with thin-shell or cracked-shell eggs. In the present invention, however, the methods are capable of handling and washing thin shell as well as cracked shell eggs, without loss. This is believed to be attributable to the entire absence of pressure on the shell, as well as the immovable relationship of the eggs which is maintained during the cleansing process.

Moreover, by the use of applicant's methods, the eggs are maintained in fresher condition and last longer. The warmth of the detergent enveloping the egg, as heretofore described, causes the interior of the egg to expand and thereby resist the entrance of bacteria through the pores of the shell. However, in situations where eggs are compelled to wait for the cleansing operation, the bacteria have an opportunity to enter into the pores of the shell and, when brushes or rubbing or pressure of any kind is then applied to the shell, the entrance of bacteria to the interior is greatly facilitated.

Figure 3:
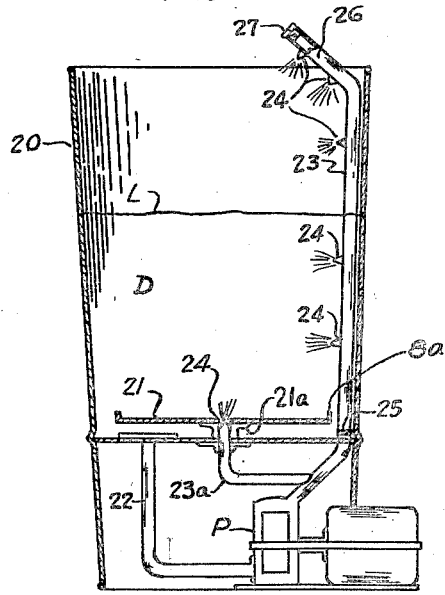
Fig. 3 is a modification, with parts omitted for the sake of clarification, illustrating another device for practicing a method.

A modified method may be practiced by the device illustrated in Fig. 3, wherein the tank, sleeve or container 20 is also provided with a swiveled platform or turn-table 21, similar to that illustrated in Fig. 2. A flange 8a is provided for the purpose heretofore described. A partition, similar to floor or partition 6, in Fig. 2, is provided in the form illustrated in Fig. 3, nearer the lower or reduced end of the container or sleeve 20, thereby providing a larger upper compartment and a smaller lower compartment. However, the stud 9 is dispensed with, and a collar 21a provided, which surrounds outlet pipe 23a. The heating unit, thermostat and wiring connections, drain, etc., have been omitted, for convenience in illustration. However, it is understood that, in practicing this method, they are also part of this embodiment. Therefore, in addition to the parts and features of Fig. 2 which are also incorporated in Fig. 3, the latter also includes means for positively circulating the liquid detergent D, relative to the eggs. This comprises a pump P, operated by an electric motor, which pumps the liquid out of the larger upper compartment of sleeve or container 20, through pipe 22, and back again into the upper compartment of sleeve or container 20 through pipes 23, 23a and outlet nozzles 24. The pipe 23 is swiveled at 25 to permit rotation about its axis. This upstanding swivel pipe 23 is positioned closely adjacent to the inner wall of the tank or container, and its upper end is bent over to an inclined position to provide a pipe section 26, which terminates in a screw threaded end for receiving a clean-out plug 27. This pipe section 26 also serves as a handle for swinging the pipe 23 from one position to another.

The pipe 23 and its inwardly inclined end 26 are provided with a series of spaced nozzles or orifices 24, which are preferably in substantially the same vertical plane along the circumference of the pipe. It will thus be seen that the streams of liquid from pipes 23 and 23a and 26 and nozzles 24, engage the eggs and the basket above the liquid level as well as below and underneath the liquid level.

As illustrated in Fig. 3, the nozzles 24 on pipes 23 and 23a, create jets above and below the liquid level. Those nozzles 24 on pipe 23, which are beneath the liquid level, send jets into the side of the basket of eggs, while the nozzle 24 on pipe 23a directs a jet beneath the basket of eggs and into the eggs from below.

In the use of this apparatus in Fig. 3, the basket B containing eggs to be cleansed is placed in the upper compartment of sleeve or container 20 until it rests on platform 21, within the area defined by flange 8a, with the level of the liquid above the eggs. Upon actuation of the pump P, the liquid is drawn from the bottom of the upper compartment and discharged again into the upper compartment, through nozzles or orifices 24, both above and beneath the liquid level L. As the pipe 23 is swiveled, it may be positioned in various locations. In some instances, it may be positioned so that the liquid from the nozzles 24 will be radially disposed with respect to container 20. In other circumstances, it may be arranged so that the nozzles are directed circumferentially. In either event, the liquid is driven through the eggs, either by direct force onto the eggs, or by a whirling circumferential current.

As just mentioned, the nozzles 24 may be radially disposed so as to agitate the liquid and send jets by direct force onto the eggs. In any position of the pipe 23, however, the jet from nozzle 24 on pipe 23a (Fig. 3) serves to agitate the liquid from beneath the eggs.

It is further noteworthy, that the speed of the current, as well as the speed of the revolving basket, can be regulated. This result is derived from the swivel pipe 23, which, as above stated, may be placed in any position about its vertical axis, by grasping end 26 so that its nozzles 24 may be in substantially vertical planes ranging from a radial position to a circumferential or tangential position. In the latter position, the force of the liquid causes the fastest revolution of the water and basket, while the slowest or least revolution is in a position with said nozzles almost radially disposed.

In the actual practice of the method employed in the modification in Fig. 3, just described, I find certain other advantageous results. The force of the streams from the nozzles 24 in the swivel pipe 23, or the revolving movement of the liquid in the circumferential current, or both, have the effect of driving and revolving the basket of eggs and platform or turn-table 21 about their vertical axes. The speed of revolution of these elements, due to their mass, causes them to lag behind the speed or movement of the whirling current, so that relative motion between the two is preserved.

In this step in practicing the method, the flange 8a serves the necessary purpose of keeping the basket revolving as a unit with turntable 21, and prevents slipping or lateral relative movement between the two. Moreover, the streams of detergent descending from nozzles 24 in the inclined pipe section 26, add materially to the cleansing method by (1) driving detergent onto the upper area of the eggs; and (2) by providing additional energy for driving and revolving the basket, while immersed.

As above stated, the turn-table 21 is designed to facilitate rotation of a basket of eggs about a vertical axis, thereby reducing to a very minimum the movement within the shells of the whites and yolks of the eggs. In the practice of applicant's methods, the eggs are never thrown or moved sideways or upside down. Applicant has noted from experience and experiment that care must be exercised to see that the eggs are not inverted during the washing operation. This insures the best quality of eggs and guards against the breakdown of the yolk within the shell, which is not an uncommon result with inverting the egg or handling it too carelessly. In other words, due to their very nature, eggs must be handled tenderly, to achieve best quality and marketability. It is preferable, therefore, in methods of washing eggs, to handle them as little as possible, and to eliminate, so far as possible, any movement which might disturb the egg contents, either violently or minutely.

In practicing applicant's methods of revolving or rotating the eggs in bulk, about a vertical axis, in relative immovable position, the resulting centrifugal force tends to hold and maintain the egg contents, in one immovable position within the shell, while the revolving and cleaning operation is completed.

It will be seen, upon reference to the detailed description of Fig. 3, that both methods of cleansing eggs in bulk may be practiced, by the use of the apparatus in Fig. 3—viz., that method heretofore described as practiced with respect to Fig. 2, as well as that method just described above with respect to Fig. 3. Accordingly, in the device of Fig. 3, one may manually move the egg basket (with the pump and motor idle) in the manner described earlier herein with respect to Fig. 2, or one may cause the motor and pump to be actuated, and the egg basket is moved by the streams from nozzles 24 without the use of the hands.

It will be observed that the partition 6 in Fig. 2, above which the turntable 8 is mounted, divides the container 5 into an upper washing compartment of greater size and a lower machine compartment of lesser size and within which is housed the bearing or depending stud 9 of the turn-table and the heating control mechanism 14. Similarly, in the form disclosed in Fig. 3 of the drawing, for practicing a modified method, the horizontally disposed partition divides the container into an upper washing compartment intended to receive the basket of eggs and liquid detergent, and into a lower machine compartment which houses the pumping or fluid circulating device P and associated inlet and outlet as well as the heat control mechanism, not shown.

It is apparent to those skilled in the art that the methods may be practiced by the use of various means other than by the employment of the devices illustrated in the drawings. If it is desired to practice the method described with respect to Fig. 3—i. e., by the use of a pump and a circumferentially moving current, and apply it in washing a plurality of baskets of eggs, such method may be employed without departing from the invention. For example, a container or tank of greater capacity may be provided for holding the heated detergent and a turn-table large enough to hold a plurality of baskets of eggs may be provided. In such circumstances, one or more tangentially disposed inlet nozzles or orifices may be provided for circulating the detergent, establishing a circumferential current and thereby causing a revolving motion of the turn-table and of the plurality of baskets as a unit, while immersed.

Moreover, the achievements derived from these methods may also be obtained by a bodily movement of a basket of eggs in bulk, through a liquid detergent whose relative temperature is in excess of the temperature of the eggs in bulk, and which detergent is at the same time being agitated.

It is noteworthy that, in the methods of applicant's improvements, best results are achieved by having the basket or baskets, and circulating detergent, move about a substantially common vertical axis.

Moreover, applicant's methods permit the eggs to be cleaned in their original package or container, since they are gathered from the nest in baskets such as B, and the methods are practiced upon this original group of eggs in bulk, without them being individually or manually touched, moved or removed.

It will be apparent that the turn-table 21 and cluster of eggs in the basket B thereon, are freely rotatable. They may be revolved freely by hand or by the sprays 24 from pipe 23 and/or pipe section 26, or by the circularly moving current of the detergent. It is noteworthy that the cluster of eggs is not driven by any direct connection from a power means, and is not arrested by any mechanical transmission means. The inception and maintenance of revolving movement of the cluster of eggs is slow, gradual and smooth, so that the contents of the eggs within the shells receive little or no shock, or sudden jerks. Likewise, upon turning off the pump P, the sprays from orifices 24 are stopped, and the revolving liquid detergent and revolving cluster of eggs gently slow down and die away to a smooth, gradual standstill. In other words, they come to rest as the revolving energy diminishes, without having a "brake" applied to them which might impart a sudden jolt, and impair or break down the cords and membrane sealing the yolk within the shell.

The foregoing results may be achieved by the devices described herein as illustrative, or by other mechanisms, which may be devised for practicing applicant's methods, without departing from the spirit of the improvements and the scope of the claims.

What I claim as my invention is:

1. A method of cleaning eggs, comprising a series of steps including gathering a plurality of newly laid eggs into an original cluster in shell to shell engagement, disposing them in cluster condition for movement about a vertical axis, maintaining a bath of liquid detergent about the cluster, revolving the cluster of eggs and detergent about a vertical axis and spraying the revolving cluster with a portion of the said detergent at an angle to the vertical axis of the cluster.

2. In a method of cleaning eggs, disposing a plurality of eggs in shell to shell engagement in a cluster, maintaining the engaged eggs immovable relative to each other, immersing the cluster of eggs in a liquid detergent having a temperature from 105° Fahrenheit to approximately 120° Fahrenheit, revolving the detergent about a vertical axis, revolving the cluster of eggs about its own vertical axis in the same circular direction as the detergent, spraying the cluster of eggs with the liquid detergent, from above the detergent level, spraying the cluster of eggs from beneath the detergent level, and directing the sprays at a tangent to the circular direction of the revolving cluster of eggs.

3. In a method of cleaning eggs, disposing a plurality of eggs in shell to shell engagement in a cluster, immersing the cluster of eggs in a liquid detergent having a temperature from 105° Fahrenheit to approximately 120° Fahrenheit, revolving the detergent about a vertical axis, revolving the cluster of eggs about a vertical axis in the same circular direction as the detergent, spraying the cluster of eggs with the liquid detergent, from above the detergent level, spraying the cluster of eggs from beneath the detergent level, and directing the sprays at a tangent to the circular direction of the revolving cluster of eggs.

4. In a method of cleaning eggs, disposing a plurality of eggs in shell to shell engagement in a cluster, maintaining the engaged eggs immovable relative to one another, immersing the cluster of eggs in a liquid detergent, revolving the detergent about a vertical axis, revolving the cluster of eggs about a vertical axis in the same circular direction as the detergent, spraying the cluster of eggs with a portion of the same detergent from above the detergent level, spraying the cluster of eggs beneath the detergent level, and directing the sprays at an angle to the circular direction of the revolving cluster of eggs.

5. In a method of cleaning eggs, disposing a plurality of eggs in shell to shell engagement in a cluster, maintaining the engaged eggs immovable relative to one another, immersing the cluster of eggs in a liquid detergent, revolving the detergent about a vertical axis, revolving the cluster of eggs about a vertical axis in the same circular direction as the detergent, spraying the cluster of eggs with the liquid detergent, from above the detergent level, spraying the cluster of eggs beneath the detergent level, and directing the sprays at an angle to the circular direction of the revolving cluster of eggs.

6. In a method of cleaning eggs, disposing a plurality of eggs in shell to shell engagement in a cluster, disposing the cluster of eggs in a liquid detergent, revolving the detergent and the cluster of eggs about a common vertical axis, spraying the cluster of eggs with the liquid detergent, and directing the spray at a tangent to the circular direction of the revolving cluster of eggs.

7. In a method of cleaning eggs, disposing a plurality of eggs in shell to shell engagement in a cluster, maintaining the engaged eggs immovable relative to one another, disposing the cluster of eggs in a liquid detergent, revolving the detergent and the cluster of eggs about a common vertical axis in the same circular direction, spraying the cluster of eggs with the liquid detergent, and directing the spray at an angle to the circular direction of the revolving cluster of eggs.

8. In a method of cleaning eggs, disposing a plurality of eggs in shell to shell engagement in a cluster, maintaining the engaged eggs immovable relative to each other, maintaining a detergent at a fixed liquid level and at a substantially even temperature of 120° Fahrenheit, immersing the cluster of eggs in the detergent, spraying the cluster of eggs with a portion of the detergent from above the detergent level, spraying the cluster of eggs from beneath the detergent level, and directing the sprays at an area adjacent the perimeter of the cluster for revolving the cluster and the detergent about a substantially common vertical axis.

9. In a method of cleaning eggs, disposing a plurality of eggs in shell to shell engagement in a cluster, maintaining the engaged eggs immovable relative to each other, maintaining a detergent at a fixed liquid level and at a substantially even temperature within the range of 105° Fahrenheit to 120° Fahrenheit, immersing the cluster of eggs in the detergent, spraying the cluster of eggs with a portion of the detergent from beneath the detergent level, and directing the sprays at an area adjacent the perimeter of the cluster for revolving the cluster and the detergent about a substantially common vertical axis.

10. In a method of cleaning eggs, disposing a plurality of eggs in shell to shell engagement in a cluster, immersing the cluster of eggs in a liquid detergent, maintaining the bath of liquid detergent about the entire cluster of eggs, and agitating the detergent from beneath the liquid detergent level.

11. In a method of cleaning eggs, disposing a plurality of eggs in shell to shell engagement in a cluster, immersing the cluster of eggs in a liquid detergent, maintaining the bath of liquid detergent about the entire cluster of eggs, maintaining the detergent at a temperature between 105° and 120° Fahrenheit, and injecting a stream of liquid detergent beneath the cluster while immersed.

12. In a method of cleaning eggs, disposing a plurality of eggs in shell to shell engagement in a cluster, immersing the cluster of eggs in a liquid detergent, maintaining the level of liquid detergent above the entire cluster of eggs, maintaining the detergent at a temperature between 105° and 120° Fahrenheit, and maintaining jet action beneath the cluster while immersed.

13. In a method of cleaning eggs, disposing a plurality of eggs in shell to shell engagement in a cluster, immersing the cluster of eggs in a liquid detergent, maintaining the bath of liquid detergent about the entire cluster of eggs, maintaining the detergent at a temperature between 105° and 120° Fahrenheit, and maintaining jet action from beneath and into the cluster while immersed.

14. In a method of cleaning eggs, disposing a plurality of eggs in shell to shell engagement in a cluster, immersing the cluster of eggs in a liquid detergent, maintaining the bath of liquid detergent about the entire cluster of eggs, and agitating the liquid detergent by applying force to the liquid from beneath the cluster.

15. In a method of cleaning eggs, disposing a plurality of eggs in shell to shell engagement in a cluster, immersing the cluster of eggs in a liquid detergent, maintaining the bath of liquid detergent about the entire cluster of eggs, and maintaining the liquid detergent in agitation during the cleaning operation while the cluster is immersed.

16. In a method of cleaning eggs, disposing a plurality of eggs in shell to shell engagement in a cluster, immersing the cluster of eggs in a liquid detergent, maintaining the bath of liquid detergent about the entire cluster of eggs, and agitating the liquid detergent by applying force to the liquid from the side of the bath and beneath the liquid level.

17. In a method of cleaning eggs, disposing a plurality of eggs in shell to shell engagement in a cluster, immersing the cluster of eggs in a liquid detergent, maintaining the bath of liquid detergent about the entire cluster of eggs, and agitating the liquid detergent by applying force to the liquid downwardly toward the cluster from above the liquid level.

18. In a method of cleaning eggs, disposing a plurality of eggs in shell to shell engagement in a cluster, immersing the cluster of eggs in a liquid detergent, maintaining the bath of liquid detergent about the entire cluster of eggs, and circulating the liquid detergent relative to the eggs.

19. In a method of cleaning eggs, disposing a plurality of eggs in shell to shell engagement in a cluster, immersing the cluster of eggs in a liquid detergent, maintaining the bath of liquid detergent about the entire cluster of eggs, and withdrawing the liquid detergent from the bath and concurrently returning it to the bath while the cluster is immersed therein.

20. In a method of cleaning eggs, disposing a plurality of eggs in shell to shell engagement in a cluster, immersing the cluster of eggs in a liquid detergent, maintaining the level of liquid detergent above the cluster of eggs, and continuously withdrawing the liquid detergent from the bath and concurrently returning it to the bath without exposing the cluster.

21. In a method of cleaning eggs, disposing a plurality of eggs in shell to shell engagement in a cluster, immersing the cluster of eggs in a liquid detergent, maintaining the level of the bath of liquid detergent above the entire cluster of eggs, and withdrawing the liquid detergent from the bath and concurrently returning it to the bath without reducing the level of the bath.

22. In a method of cleaning eggs, disposing a plurality of eggs in shell to shell engagement in a cluster, immersing the cluster of eggs in a liquid detergent, maintaining the bath of liquid detergent above the entire cluster of eggs, and circulating the liquid detergent to and from the bath without exposing any portion of the cluster above the liquid level.

CHARLES G. PADEN.

REFERENCES CITED

The following references are of record in the file of this patent:

UNITED STATES PATENTS

| Number | Name | Date |
|---|---|---|
| 2,087,844 | Hansen | July 20, 1937 |
| 2,302,809 | Stehlik | Nov. 24, 1942 |
| 2,371,867 | Boyles | Mar. 20, 1945 |
| 2,374,500 | Reading | Apr. 24, 1945 |
| 2,529,090 | Lesher | Nov. 7, 1950 |

OTHER REFERENCES

"Food Industries," March 1948, page 71, article entitled "Washes and Pasteurizes Eggs."